(12) United States Patent
Reali et al.

(10) Patent No.: US 8,790,570 B2
(45) Date of Patent: Jul. 29, 2014

(54) MOVABLE DEVICE FOR INJECTING OXYGEN AND OTHER MATERIALS INTO ELECTRIC ARC FURNACE

(75) Inventors: Sivio Maria Reali, Milan (IT); Giancarlo Cavallini, Monza (IT); Mauro Grioni, Colturano-Milano (IT)

(73) Assignee: Tenova S.p.A., Milan (IT)

( * ) Notice: Subject to any disclaimer, the term of this patent is extended or adjusted under 35 U.S.C. 154(b) by 291 days.

(21) Appl. No.: 13/322,509

(22) PCT Filed: Jun. 9, 2010

(86) PCT No.: PCT/EP2010/003748
§ 371 (c)(1),
(2), (4) Date: Nov. 25, 2011

(87) PCT Pub. No.: WO2010/145845
PCT Pub. Date: Dec. 23, 2010

(65) Prior Publication Data
US 2012/0074622 A1 Mar. 29, 2012

(30) Foreign Application Priority Data

Jun. 17, 2009 (IT) .............................. MI2009A1069

(51) Int. Cl.
*C21B 7/16* (2006.01)
*F27B 3/22* (2006.01)
*F27D 3/18* (2006.01)
*C21C 5/52* (2006.01)

(52) U.S. Cl.
CPC .............. *C21C 5/5217* (2013.01); *F27B 3/225* (2013.01); *F27D 3/18* (2013.01); *F27B 3/22* (2013.01)
USPC .............................. 266/217; 266/265; 373/72

(58) Field of Classification Search
CPC .............. F27B 3/22; F27B 3/225; F27D 3/18; C21C 5/5217
USPC ............... 266/216, 217, 265, 241; 373/66, 72
See application file for complete search history.

(56) References Cited

U.S. PATENT DOCUMENTS

| 4,752,330 A | 6/1988 | Gitman |
| 5,630,713 A * | 5/1997 | Shver et al. .................. 431/189 |
| 2003/0000338 A1 | 1/2003 | Shver |
| 2004/0213318 A1 | 10/2004 | Strelbisky |

FOREIGN PATENT DOCUMENTS

EP 0686807 12/1995

OTHER PUBLICATIONS

Koester, V. et al., The advanced KT injection system for high productivity EAFs, AISE Steel Technology, Pittsburg, PA, vol. 79, No. 3, Mar. 1, 2002, pp. 28-35.
Harris, C. et al., Industrial application of supersonic lance: The KT system numeric simulation, operating practice, results and perspectives, AISTECH 2006, Jan. 1, 2006, vol. 1, pp. 483-490.

* cited by examiner

*Primary Examiner* — Scott Kastler
(74) *Attorney, Agent, or Firm* — Themis Law

(57) ABSTRACT

A movable device for injecting oxygen and other technical materials into an electric arc furnace includes a housing situated above a portion of a step of a crucible and equipped with a cooling coil, an injection lance of oxygen and other technical materials, a supporting and moving system of the lance between minimum and maximum range points of the liquid bath level contained therein, positioned in the housing, an opening situated in the housing and facing the inside of the crucible in which the lance is transferably guided, and a scraping member disposed between the opening and the lance.

6 Claims, 3 Drawing Sheets

MOVABLE DEVICE FOR INJECTING OXYGEN AND OTHER MATERIALS INTO ELECTRIC ARC FURNACE

FIELD OF THE INVENTION

The present invention relates to a movable device for injecting oxygen and other technical materials into an electric arc furnace.

BACKGROUND OF THE INVENTION

For the production of liquid metal, electric arc fusion furnaces (EAF) normally use the injection of a jet of oxygen combined with other gases (for example methane or particulates such as graphite) in order to remove, with an exothermic chemical reaction, undesired elements contained in the liquid metal bath.

The production of heat "in situ", generated by this reaction, is therefore added to the energy of an electric origin, supplied by the electrodes. The effect of this combined action is accelerating the production cycle, at the same time improving the quality of the product (liquid metal). The benefits induced by this technique essentially depend on the effective quantity of gas or particulate materials made available to the liquid metal. This is obviously effected by limiting as much as possible, the dispersion of heat which directly influences the reaction kinetics in the bath. The technique adopted in the lances applied to EAFs envisages a De Laval nozzle specifically studied for allowing the jet of oxygen or other material, to reach supersonic velocities with a collimation sufficient for perforating the outer layer of slag and enabling the gas to be bubbled into the liquid bath.

Two types of lances have been developed for effecting the above principle. The first, from a historical point of view, is the so-called "door lance". This lance is a few meters long and enters the furnace through the openings present therein, for example the slag door.

The accessibility is limited as not all points of the furnace can be reached, but a solution of this kind allows the thermal problem to be concentrated on the tip of the lance; all the other components are left outside the furnace in a relatively safe and easily accessible environment.

This solution obviously has various limitations induced by the accessibility to the furnace and especially the insufflation point of the oxygen; in order to homogenize the bath, the stirring must therefore be particularly efficient.

A further limitation consists in the necessity, for the whole time necessary for the insufflation, to keep the passage space of the lance open with the consequent entrance of false cold air and the introduction of vapors and heat.

This obviously jeopardizes the consumptions and environmental impact of the whole system.

It should finally be pointed out that these movable systems have considerable dimensions and costs (not only investment but also operating; it is sufficient to consider the water consumptions for guaranteeing the cooling of a lance 4 meters long) in proportion to these.

A further critical point consists in the fact that an arm coming from the outside can be damaged by scrap still stacked, in the collapsing or oscillating phase in the bath making its use under conditions other than those of a flat bath, unadvisable.

To try and overcome these problems, small-dimensioned and relatively inexpensive lances have been developed, of which an example is provided in the patent Valery SHVER CA2449774. The ejectors of these lances (as disclosed, for example, by the same Valery SHVER in U.S. Pat. No. 6,289,035 and U.S. Pat. No. 6,614,831) are arranged in a fixed position inside the furnace so as to insufflate oxygen into the bath, and also other technical substances (see, for example, the disclosures of Hubert KNAPP and Peter HOFFMAN in U.S. Pat. No. 5,332,199). Their geometrical arrangement in plan view (and their inclination) allows reactive elements and heat energy in the most critical positions (on the edges and in the areas farthest away from the electrodes) of the bath to be transferred, with the effect of homogenizing the refining of the metal, increasing the stirring and, in ultimate analysis, reducing the steelwork cycle times.

Positioning inside the furnace implies exposure to a particularly hostile environment. The weakest parts of the lance (for example the connection area with the gas lines and entry regulation valves) must be kept in a protected and cooled area, far from direct exposure to heat and spurts of slag coming from the bath. Practically all of the cited reference documents disclose that the lance must be positioned inside a cooled structure anchored to the wall of the furnace and passing through a bulkhead which supports them, constrains them and enables their disassembly and maintenance. This bulkhead also has the function of isolation preventing the atmosphere and heat of the furnace from being dispersed in the surrounding environment.

Arrangements of this kind obviously entail greater difficulty in the maintenance as it is necessary to operate with the furnace at a standstill and also because the lances are covered by layers of slag due to the spurts produced by the insufflation, stirring and introduction of materials into the furnace. Modern arc furnaces use a containment crucible of the melting material, partially cooled and partially refractory. In the most modern steel production techniques, this recipient can be substituted when worn by another identical crucible having a new refractory coating. This change of casing operation is effected by lifting with a crane and it is evident that the more rapidly this takes place, the more time there is for the production. It is obvious that the harder the slag encrustation, the longer the times necessary for the reconditioning of the lances will be, before their re-installation on the new crucible.

A further problem of the known arrangements consists in the irremovability of the same lances. Once they have been fixed to the supporting bulkhead, their distance from the metal only depends on the level reached by the liquid metal and by the overlying slag. Due to the necessity of effecting maintenance operations with the furnace at a standstill (therefore after long periods) and the fact that, when inactive (without any injection of gas or other material), there is no shield which prevents the deposit of slag on the nozzles, it is necessary to protect the lance as much as possible by removing it from the bath. In practice, even if fluid-dynamic systems are used for extending the jet coherence (such as the shrouding effect), their use can only be exploited under flat bath refinery conditions (i.e. when almost all the scrap charged has become liquid).

It is evident that this imposes serious limitations to the cycle times, inhibiting the possibility of operating with the bath refining contemporaneously with the dissolving of the scrap.

Again, the art has so far tried to overcome this state of affairs by acting on the very nature of the concept of the lance. In EP1848927 (of BIANCHI FERRI, MEMOLI, POZZI, MALFA) the lance, during the scrap dissolving phase, can operate as a burner modulating its emission intensity continuously and without mechanical movements, in relation to the specific necessities of the moment.

It is evident that this method substantially accelerates the dissolving phase, but for this very reason it cannot anticipate the beginning of the refining phase.

The same can be said for the lance-burner described in U.S. Pat. No. 4,752,330 and in U.S. Pat. No. 4,865,297 of Grigory GITMAN. This, in fact, is a group positioned on a wall of the furnace and oriented in the direction of the bath. A common oxygen tube, with the possibility of also operating in immersion, is supported in the body of the lance-burner. In this configuration, the oxygen passing through the tube is combined with the fuel injected into the fixed combustion chamber (anchored to the wall of the furnace) acting as burner (low impact energy of the outgoing gases and high heat transfer values to the scrap), until the dissolution of the charge. In the refining phase (without encumbrances of scrap), the oxygen tube extends through the body of the lance-burner reaching the bath and extremely high impact energy values of the gases typical of oxygen lances. The system therefore commutes from the burner configuration to the lance configuration without the possibility of intermediate steps. The system proposed is consequently not able to effect metal refining in the presence of scrap and a high efficiency and efficacy of use is only associated with the first moments of the steelwork cycle with a batch charge. When operating under a continuous charging condition of the scrap (for example with a Consteel®) or when the collapse of the charge removes the material from the oxygen pipe, the system, in a burner configuration, gradually becomes less efficient even if it cannot yet operate as a lance due to the presence of floating scrap in the bath.

Finally, from the inclination of the supporting system of the lance and maximum extension possible of the same, it can be deducted that even in the absence of scrap, this system would in any case not be able to operate for typical levels of liquid metal of a foot at the start of the cycle. Further critical points are associated with the investment costs (the combustion in fact develops inside the group making the requisites of the material used for its construction particularly critical) and maintenance (from what can be deducted from the patents, the group is assembled on the wall of the furnace without any protection, the lance tube which extends from this must be cooled for the whole of its extension and this requires the consumption of a large quantity of water or other cooling liquid).

It should be pointed out, however, that the above patents refer to an oxygen lance.

SUMMARY OF THE INVENTION

In view of the known solutions proposed, it is evident that the objective of the present invention is to increase the efficiency of the steelwork cycle reducing the times and operating and maintenance costs.

A further objective of the invention is to be able to start the refining phase of the bath as soon as the encumbrance conditions of the scrap allow this.

Another objective of the invention is to provide a device which is such as to prevent false air losses or gas and heat leakages in the system with the possibility of reducing the performances and/or damage of the various devices envisaged.

Yet another objective of the invention is to provide a device which is such as to limit the dismantling, reassembly, assembly times of the vessel, i.e. reconditioning in general.

A further objective is to provide a device which is capable of effecting metal refining in the presence of scrap and which has a high efficiency and efficacy of use at the first moments of the steelwork cycle and also with a batch charge.

In view of the above objectives, according to the present invention, a movable device has been conceived for the injection of oxygen and other technical materials into an electric arc furnace having the characteristics specified in the enclosed claims.

BRIEF DESCRIPTION OF THE DRAWINGS

The structural and functional characteristics of the present invention and its advantages with respect to the known art will appear more evident from the following description referring to the enclosed drawings, which show a movable device for the injection of oxygen and other technical materials into an electric arc furnace according to the innovative principles of the same invention.

In the drawings.

DETAILED DESCRIPTION OF EMBODIMENTS OF THE INVENTION

Figure 1:
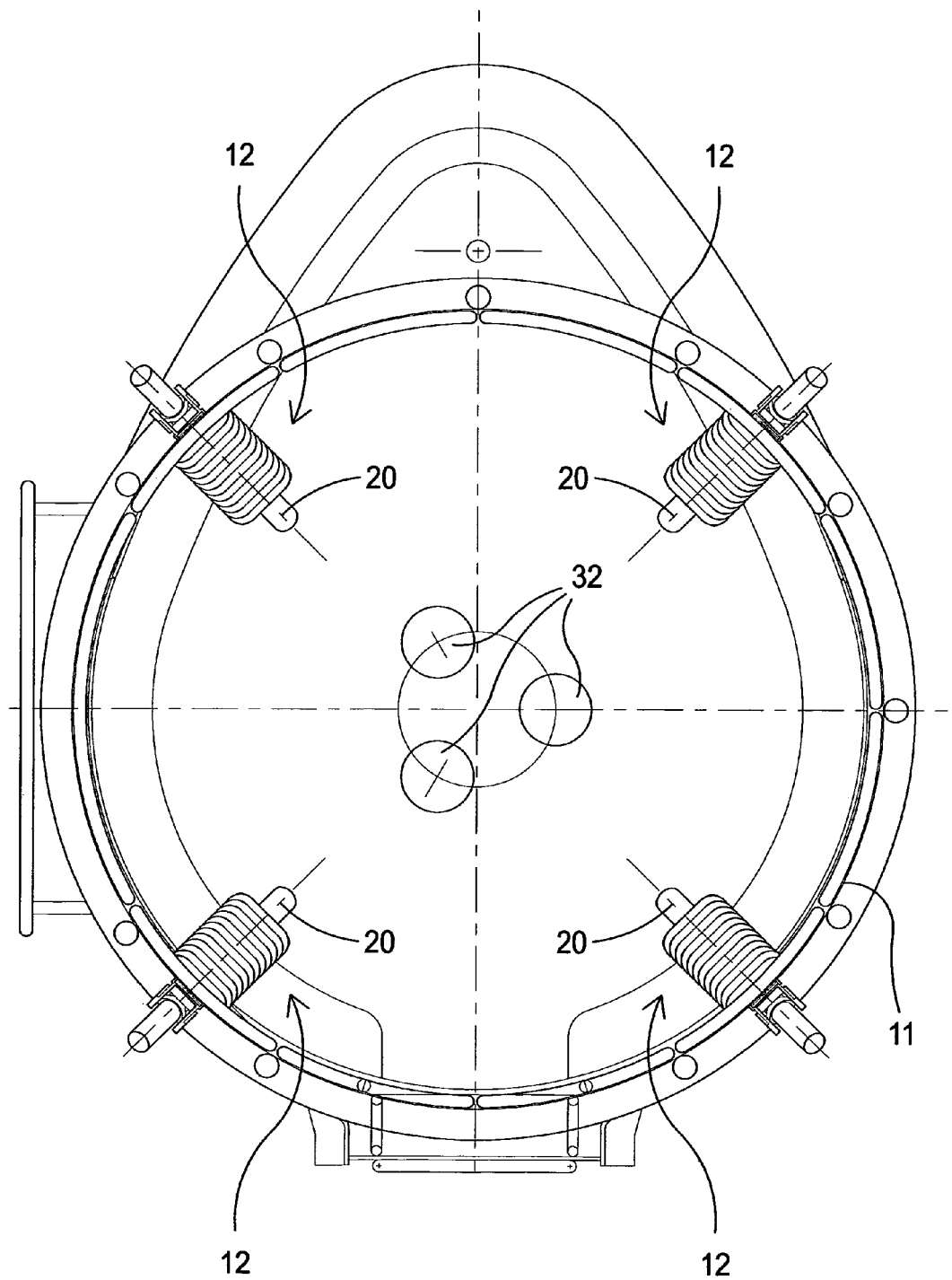
FIG. 1 shows a plan view from above of a crucible of an electric furnace containing four movable devices for the injection of oxygen and other technical materials according to the present invention.

With reference first of all to FIG. 1, this shows a plan view from above of a crucible 11 of an electric furnace, illustratively containing four movable devices 12 for the injection of oxygen and other technical materials according to the present invention. The movable devices 12 are arranged around the bath in order to optimize the homogeneity of the treatment.

Figure 2:
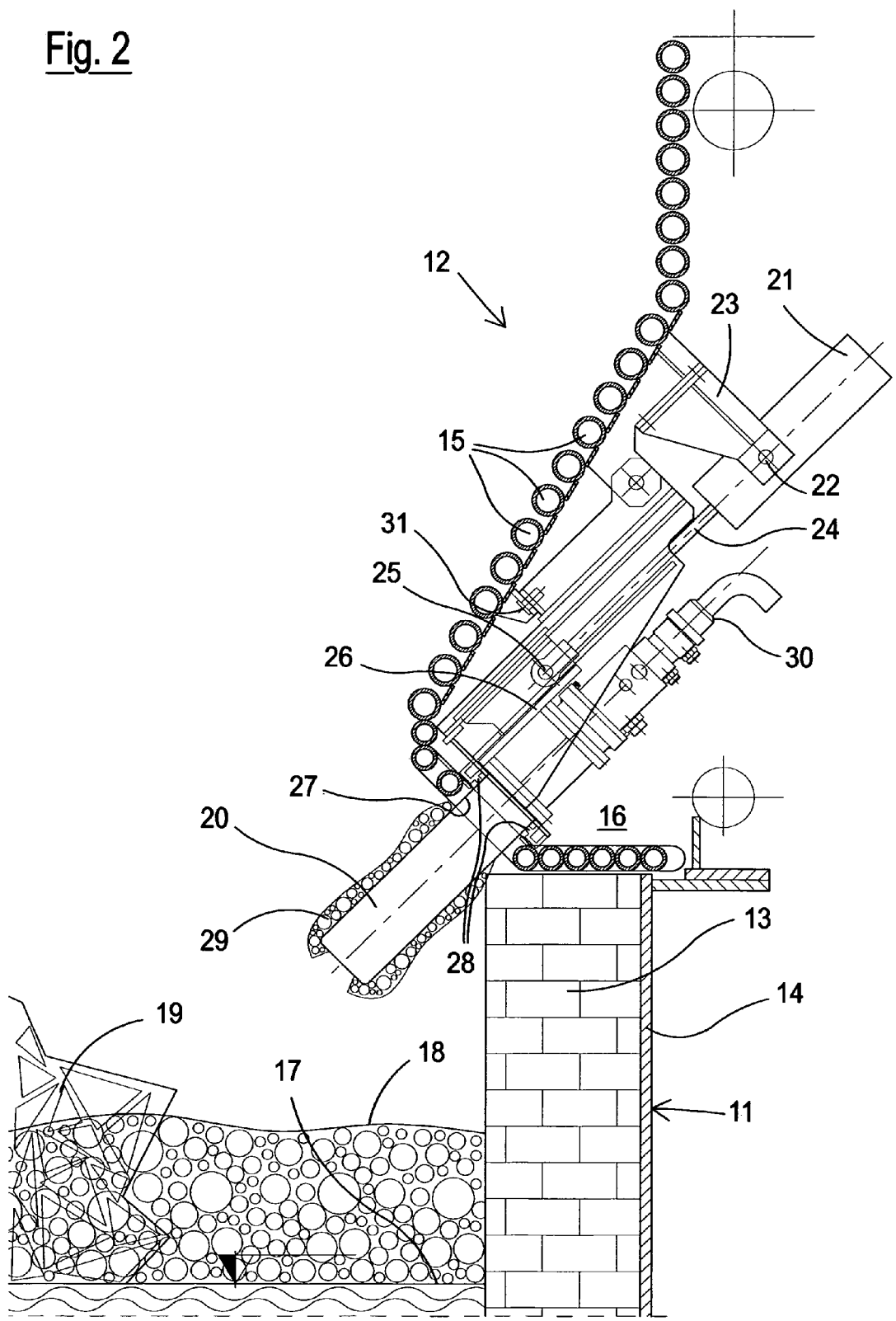
FIG. 2 is a sectional view of the device of the invention with the lance in an extended position and with a low level of liquid metal and slag.
Figure 3:
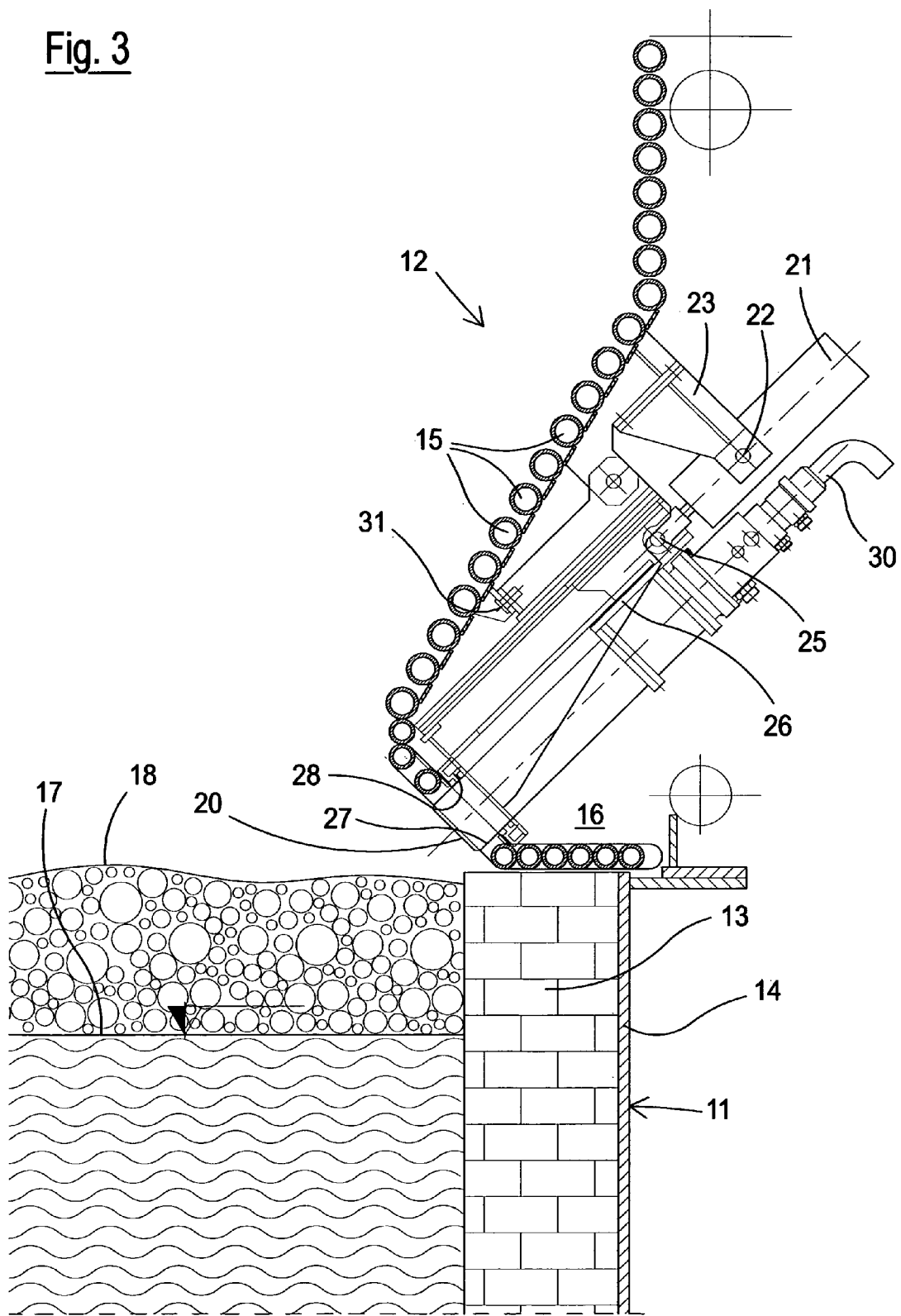
FIG. 3 is a view identical to that of FIG. 2 but with the lance in an operative condition, almost completely withdrawn in the housing, for the refining phase with a maximum level of liquid metal and slag.

It should be noted that, in the illustrated arrangement, each of the devices 12, better illustrated in FIGS. 2 and 3, is situated, as far as is possible, in close proximity to the step 13 defined by refractory material which coats the metallic vessel 14 to allow the lance, in its maximum extension, to reach levels as low as possible.

In relation to the type of furnace, this system can be constrained to the step as also to the wall of the furnace (or both). An assembly integral with the upper wall of the furnace is obviously the preferred configuration. In this case, in fact, a crane is sufficient for dismantling the wall and all the devices integral with it, in a single solution.

A cooling coil 15 is also present, in which cooling water continuously circulates, which forms the outer protection wall of a housing 16 from a bath 17 of liquid metal, slag 18 and also scrap 19 present in the crucible 11.

As already mentioned, the housing 16 is preferably assembled on the upper wall of the vessel and comprises a metallic structure, cooled and airtight with respect to the crucible 11. The area beneath the housing 16, closest to the step 13 and slag bath 18, is also directly sealed from the slag, deposited therein, which thickens upon cooling on the coil 15 also situated above said step 13. Inside the housing 16, there is an injection lance 20 of oxygen and/or other technical materials, in addition to supporting and moving means of the lance itself 20 situated in the housing 16.

The moving means, in the illustrative but non-limiting embodiment shown, comprise a cylinder 21 assembled by means of pins 22 with respect to supporting flaps 23 forming the housing 16. A stem 24 of the cylinder 21 is connected by means of a pin 25 to a supporting slide 26 carrying the lance 20. These supporting and moving means of the lance 20 move it between minimum and maximum range points of the level of the liquid bath contained in the crucible.

The lance 20 exits from an opening 27, situated in the coil 15 of the housing 16, facing the interior of the crucible 11 and within which the lance 20 is transferably guided. Furthermore, in correspondence with the opening 27, there are scraping means 28 acting on the body of the lance. They are arranged so as to form a hermetic sealing at the opening 27 between themselves and the lance 20, in the part most exposed to the slag.

The scraping means 28, in the form of lips, for example, have the function of both sealing the gases present in the crucible of the furnace and also of cleaning encrustations of slag 29 accumulated on the body of the lance 20, after remaining in an extended position.

The moving means, of whatever type (motor, pneumatic, oil-pneumatic system or the like) govern the lifting of the lance 20 to follow the evolution of the liquid surface 17. During the lifting, the scraping means 28 free the lance 20 from any possible encrustations of slag 29 preparing it for the subsequent cycle.

Thanks to the presence of these scraping means 28, the lance 20 remains clean of slag encrustations 29 so that a rapid dismantling can be effected. To do this, it is sufficient to disconnect feeding tubes 30 of the cooling water and/or technical materials, operating in a single manoeuvre. The whole group consisting of the crucible 11, lances 20 and housings 16 can be transported with a crane, for example.

The rear part (towards the outside of the furnace) of the housing 16 is free and easily accessible to allow a simple maintenance of the lances 20, the hermetic sealing being guaranteed by the coil 15 and scraping means 28.

As already specified, inside the housing 16 there are supporting and moving means of the same lance 20 which are constrained by means of a contact point 31 freely removable so as to allow easy removal of the whole group. The piston 24 of said means has an extension which is sufficient for allowing the lance 20 to reach the minimum and maximum range points of the level of the liquid bath in relation to the form of the furnace and production procedure adopted.

In conventional furnaces with batch charging, the charging of the scrap is effected in a single solution, with the furnace open, in the presence of a minimum foot of molten metal (residue of the previous meltdown). During this phase, the lance 20 is kept in rest position, withdrawn (FIG. 3), and protected from the falling of scrap by the coil 15 which forms an outer wall of the housing 16.

It is optionally possible to pass a low-pressure gas into the lance 20 in order to prevent spurts of slag from obstructing its nozzles, not shown. Once the charging operations have been terminated, and the furnace closed, the cycle is started by feeding electrodes (schematized in 32) and, if present, heating wall burners of the scrap. The lance 20 in the housing 16 can be activated, although maintained in its withdrawn position, if set up as a burner (for example a lance such as that described in EP1848927). Only after dissolving most of the material or under a condition close to a flat bath condition, is it possible to extend the lance 20 to activate the injection of technical materials with the maximum possible efficiency. It should be taken into account that this insufflation acts on the liquid bath, anticipating the refining phase and releasing heat which contributes, by accelerating it, to the liquefaction of the remaining scrap still solid.

If a continuous charging system of the scrap is available, consequently maintaining control of the material introduced, the quantity of solid metal never reaches stacking levels which are such as to jeopardize the functionality of the lances and their safety. In this case, therefore, the lance is immediately extracted at its maximum extension and made operative. In this way, the refining times are reduced and the heat which enters the bath chemically, accelerates the melting process of the scrap introduced and this from the very first phases of the cycle, significantly reduces the time for each processing cycle. As already mentioned, a control system which operates on the moving means of the lance (in this case connected to a weight system of the vessel, if available) effects the lifting of the lance 20 following the optimum insufflation point.

If the conditions of the scrap allow this, the lance 20 can be extended at any moment of the processing in order to reach the optimum distance for injecting oxygen or other technical material into the liquid bath: and this regardless of the level of molten metal reached. In particular, it is obvious that the maximum efficiency of the system is obtained with continuous feeding systems such as Consteel, cited above. In these cases, in fact, the scrap is introduced into the bath with continuity, the accumulations of solid material are in any case limited and rapidly dissolve and normally these agglomerates do not create any serious hindrance to the positioning of the lance from the very first moments of the charging of the scrap.

Finally, it should be pointed out that the system operates with "internal" type lances, short and compact with much lower water consumptions, also considering the cooling circuit of the housing, than "door lances" or, in any case, extendable from the walls of the crucible of the furnace.

The present invention therefore advantageously has a series of distinctive characteristics which can be summarized as follows:

movable injection point which allows a high initial efficiency regardless of the position of the liquid bath;

protection step or balcony of the whole device;

integral connection with the crucible for a more rapid change of the casing;

hermetic sealing of the movable system with absence of a false air inlet;

cleaning system of the lance from slag deposited on the lance during its movement;

extreme compactness and low consumption of cooling water.

From the above description with reference to the figures, it is evident that a movable device for the injection of oxygen and other technical materials into an electric arc furnace according to the invention is particularly useful and advantageous.

The objective mentioned in the preamble of the description has therefore been achieved.

The protection scope of the invention is therefore delimited by the enclosed claims.

The invention claimed is:

1. A movable device for injecting oxygen and other technical materials into an electric arc furnace comprising:

a housing situated above a portion of a step of a crucible, said step providing a base for said housing and being defined by a refractory material lining said crucible;

a cooling coil disposed to provide an outer protection wall of said housing facing an inside of said crucible;

an injection lance for injecting oxygen and other technical materials;

a supporting and moving system of said lance configured to translate said lance longitudinally between minimum and maximum range points of a liquid bath level contained in said crucible, said supporting and moving system being positioned in said housing, wherein an opening is defined in said housing and in said cooling coil, said opening facing the inside of the crucible, the lance being transferably guided within said opening by said supporting and moving system; and a scraping member disposed at the opening, said scraping member acting on the lance.

2. The device according to claim 1, wherein said supporting and moving system of said lance comprises at least one actuator supported in said housing and connected to a supporting slide of said lance.

3. The device according to claim 1, wherein said cooling coil provides a hermetic sealing of an interior of the housing.

4. The device according to claim 1, wherein said supporting and moving system of said lance is arranged integrally inside said housing with freely removable contact points.

5. The device according to claim 1, wherein said scraping member is configured to seal an interior of the housing from gases present in the crucible and removes buildup of slag accumulated on the lance.

6. The device according to claim 1, wherein said cooling coil is further positioned above said step providing the base of the housing.

\* \* \* \* \*